(12) United States Patent
Hsieh

(10) Patent No.: US 11,676,017 B2
(45) Date of Patent: Jun. 13, 2023

(54) IMAGE RECOGNITION METHOD AND DEVICE

(71) Applicant: Coretronic Corporation, Hsin-Chu (TW)

(72) Inventor: Chi-Chung Hsieh, Hsin-Chu (CN)

(73) Assignee: Coretronic Corporation, Hsin-Chu (TW)

(*) Notice: Subject to any disclaimer, the term of this patent is extended or adjusted under 35 U.S.C. 154(b) by 413 days.

(21) Appl. No.: 17/093,640

(22) Filed: Nov. 10, 2020

(65) Prior Publication Data

US 2021/0142081 A1     May 13, 2021

(30) Foreign Application Priority Data

Nov. 11, 2019    (CN) .......................... 201911093467.4

(51) Int. Cl.
| | |
|---|---|
| *G06N 3/08* | (2023.01) |
| *G06N 3/04* | (2023.01) |
| *G06V 10/94* | (2022.01) |
| *G06V 40/16* | (2022.01) |
| *G06F 18/21* | (2023.01) |
| *G06V 10/764* | (2022.01) |
| *G06V 10/82* | (2022.01) |

(52) U.S. Cl.
CPC .............. *G06N 3/08* (2013.01); *G06F 18/21* (2023.01); *G06N 3/04* (2013.01); *G06V 10/764* (2022.01); *G06V 10/82* (2022.01); *G06V 10/95* (2022.01); *G06V 40/171* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 2020/0250971 A1* | 8/2020 | Zhao ................ | G08G 1/096741 |
| 2020/0301438 A1* | 9/2020 | Zhao ..................... | G06V 20/13 |

FOREIGN PATENT DOCUMENTS

| | | |
|---|---|---|
| CN | 106934799 | 7/2017 |
| CN | 109063742 | 12/2018 |
| CN | 109840560 | 6/2019 |

OTHER PUBLICATIONS

CN109840560, Liu et al, machine translated (Year: 2019).*
"Office Action of Taiwan Counterpart Application", dated Nov. 5, 2020, p. 1-p. 5.

* cited by examiner

*Primary Examiner* — Jianxun Yang
(74) *Attorney, Agent, or Firm* — JCIPRNET

(57) ABSTRACT

The disclosure provides an image recognition method and an image recognition device. The method includes: acquiring an image and capturing a plurality of feature points in the image; obtaining a capsule network, where the capsule network sequentially includes a convolution layer, a primary capsule layer, a routing capsule layer, and an output layer; inputting the image and the feature points into the convolution layer to generate a plurality of feature vectors; inputting the feature vectors and the feature points into the primary capsule layer to generate a plurality of activity vectors; and generating a recognition result corresponding to the image by the routing capsule layer and the output layer based on the activity vectors.

14 Claims, 3 Drawing Sheets

IMAGE RECOGNITION METHOD AND DEVICE

CROSS-REFERENCE TO RELATED APPLICATION

This application claims the priority benefit of China application serial no. 201911093467.4, filed on Nov. 11, 2019. The entirety of the above-mentioned patent application is hereby incorporated by reference herein and made a part of this specification.

BACKGROUND

Technical Field

The disclosure relates to an image recognition method and an image recognition device, and more particularly, to an image recognition method and an image recognition device which introduce a capsule network technique.

Description of Related Art

The convolutional neural network (CNN) is currently the mainstream image recognition technique and can capture local features through a convolution operation, remove redundant features through a pooling operation, and finally achieve the effect of object recognition through a fully connected layer. The convolution operation can make full use of local image correlation and can reduce the number of parameters and complexity through weight sharing and the pooling operation. Therefore, in the field of recognition, this technique is sufficient to replace human labor and exhibits commercialization values, and it also heralds the artificial intelligence era.

The birth of the capsule network originated from the success of the CNN. Specifically, although the convolution and pooling operations of the CNN achieve excellent feature capturing capabilities, at the same time, there is also a fundamental issue, namely, "scalar in/scalar out". In this case, because the understanding of the object is only represented as scalar, after the same object is rotated or flipped, another set of features will be formed. This may also lead to a situation where a conventional neural network fails to detect even though many sets of features relate to the same object.

The capsule network has made a breakthrough improvement to the feature capturing method, namely, "vector in/vector out". In the capsule network, the basic information and deformation information of the object may be recorded in a set of feature vectors to thereby fundamentally address the issue of the CNN that different features are formed after the same object is rotated or flipped.

The difference from the conventional neural networks lies in that each neuron in the capsule network is composed of a capsule, and the objective of each capsule is to detect the characteristic of the object. This characteristic may be converted into a vector through the output of the individual capsule, and the length and the direction of this vector can respectively have specific meanings. For example, the length of the vector may represent the probability of presence of the object detected by this capsule, and the direction of the vector may represent the characteristic (e.g., a position, a size, a material, an angle, etc.) of the detected object.

Similar to the conventional neural networks, the above vector (which is scalar in the conventional neural networks) represents a lower-level object feature, while higher-level neurons can detect the characteristic of a higher-level object through multiple lower-level object feature information. Similarly, this characteristic will also be converted into a vector, thereby achieving the operation of the neurons.

The difference from the conventional neural networks lies in that the directionality of a low-level object feature vector may affect the probability of presence of a high-level feature object. For example, two eyes that are perpendicular to each other cannot form a face.

The success of the conventional neural networks is obvious, and their capabilities are far beyond the past imagination of human beings. However, despite their success, they still have fundamental disadvantages. Specifically, for a conventional neural network, when elements such as eyes, a nose, and a mouth appear in an image, the convolutional neural network will consider it to be a human face, regardless of the unnatural positions where these elements are located.

However, the capsule network is different. The low-level capsules can retain complete component characteristics (e.g., positions, sizes, etc. of the facial features), while the high-level capsules can detect whether it is a real and complete object (face) based on these characteristics.

While retaining the advantage of the conventional neural networks, the capsule network also addresses the fundamental disadvantage of the conventional neural networks. Accordingly, the capsule network can not only improve the performance of the neural network, but also address some artificially manipulated false images (e.g., images with misplaced facial features). Therefore, the capsule network has a very wide application range. For example, the capsule network can perform all the tasks that the current neural networks are capable of and even perform better.

Although the capsule better retains the geometric relationship of the object details, in the network framework design, it does not really effectively enable the neural network to understand the geometric meaning of the object. Therefore, although this technique can have fewer training samples than the CNN, the effect is still limited.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

In view of the above, the disclosure provides an image recognition method and an image recognition device, which can be used to solve the above technical problems.

The disclosure provides an image recognition method including the following steps. An image is acquired and a plurality of feature points in the image are captured. A capsule network is obtained, where the capsule network sequentially includes a convolution layer, a primary capsule layer, at least one routing capsule layer, and an output layer. The image and the plurality of feature points are input into the convolution layer to generate a plurality of feature vectors. The plurality of feature vectors and the plurality of feature points are input into the primary capsule layer to generate a plurality of activity vectors. A recognition result corresponding to the image is generated by the at least one routing capsule layer and the output layer based on the plurality of activity vectors.

The disclosure provides an image recognition device including a storage circuit and a processor. The storage circuit stores a plurality of modules. The processor is coupled to the storage circuit and accesses the plurality of modules to perform the following steps. An image is acquired and a plurality of feature points in the image are captured. A capsule network is obtained, where the capsule network sequentially includes a convolution layer, a primary capsule layer, at least one routing capsule layer, and an output layer. The image and the plurality of feature points are input into the convolution layer to generate a plurality of feature vectors. The plurality of feature vectors and the plurality of feature points are input into the primary capsule layer to generate a plurality of activity vectors. A recognition result corresponding to the image is generated by the at least one routing capsule layer and the output layer based on the plurality of activity vectors.

Based on the above, the disclosure improves the framework and operation mechanism of the capsule network and introduces the geometric information in the image to be recognized into the overall recognition mechanism, which allows a better geometric understanding of the image and helps to improve the accuracy of the overall recognition.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
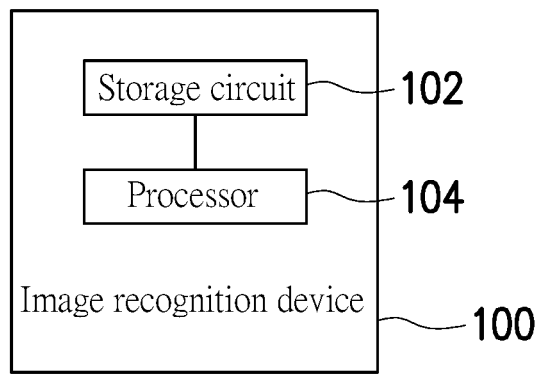
FIG. 1 a schematic view showing an image recognition device according to an embodiment of the disclosure.

Referring to FIG. 1, FIG. 1 a schematic view showing an image recognition device according to an embodiment of the disclosure. In different embodiments, an image recognition device 100 may be a smartphone, a tablet computer, a personal computer, a notebook computer, or another device having an image processing function, but is not limited thereto. As shown in FIG. 1, the image recognition device 100 may include a storage circuit 102 and a processor 104. The storage circuit 102 is, for example, any type of fixed or movable random access memory (RAM), read-only memory (ROM), flash memory, hard disk, another similar device, or a combination of the above devices, and may be configured to record a plurality of program codes or modules.

The processor 104 is coupled to the storage circuit 102 and may be a general-purpose processor, a specific-purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA), any other type of integrated circuit, a state machine, a processor based on advanced RISC machine (ARM), or a similar device.

In the embodiment of the disclosure, the processor 104 may access the modules and program codes recorded in the storage circuit 102 to realize an image recognition method proposed in the disclosure, the details of which will be described below.

Figure 2:
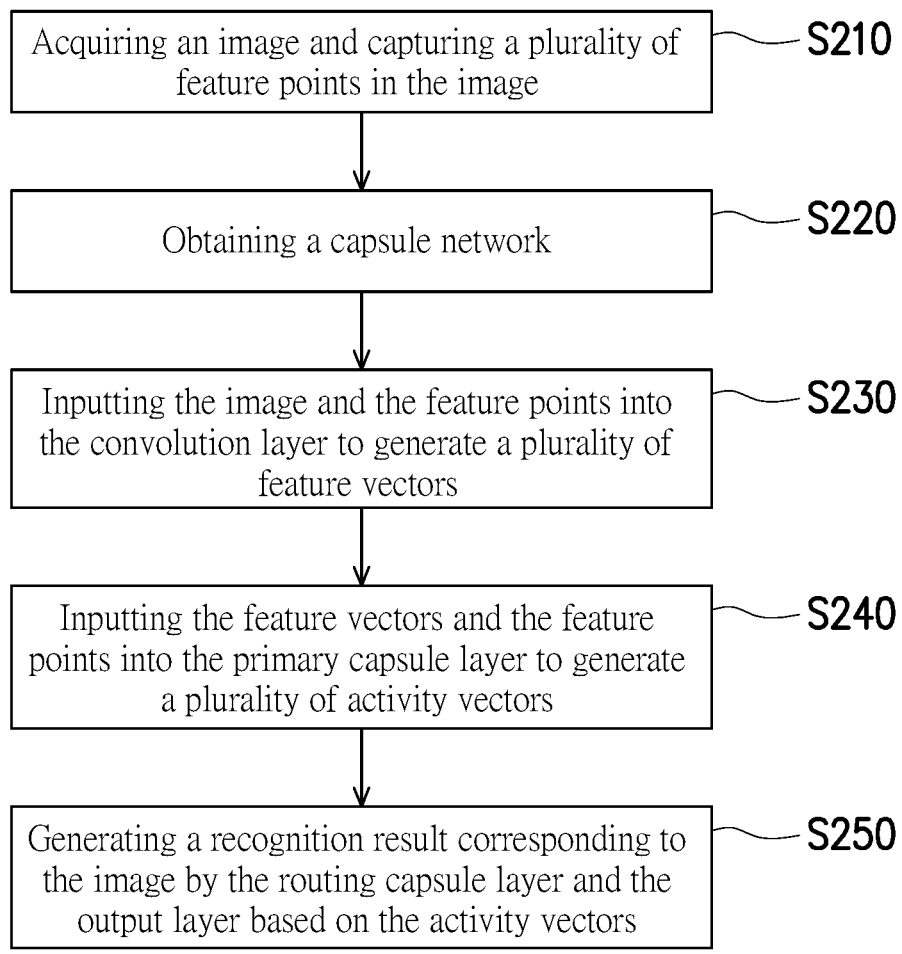
FIG. 2 is a flowchart showing an image recognition method according to an embodiment of the disclosure.

Referring to FIG. 2, FIG. 2 is a flowchart showing an image recognition method according to an embodiment of the disclosure. The method of the present embodiment may be executed by the image recognition device 100 in FIG. 1, and details of each step in FIG. 2 will be described below with reference to the components shown in FIG. 1.

First, in step S210, the processor 104 may acquire an image and capture a plurality of feature points in the image. In different embodiments, the image may be an image including a specific object captured by the image recognition device 100 through an image capturing component, an object image taken from any image database or storage location, an object image frame in a video, or any other image, but is not limited thereto. To facilitate understanding of the concept of the disclosure, further description will be made below with reference to FIG. 3, but it is not intended to limit the possible implementation of the disclosure.

Figure 3:
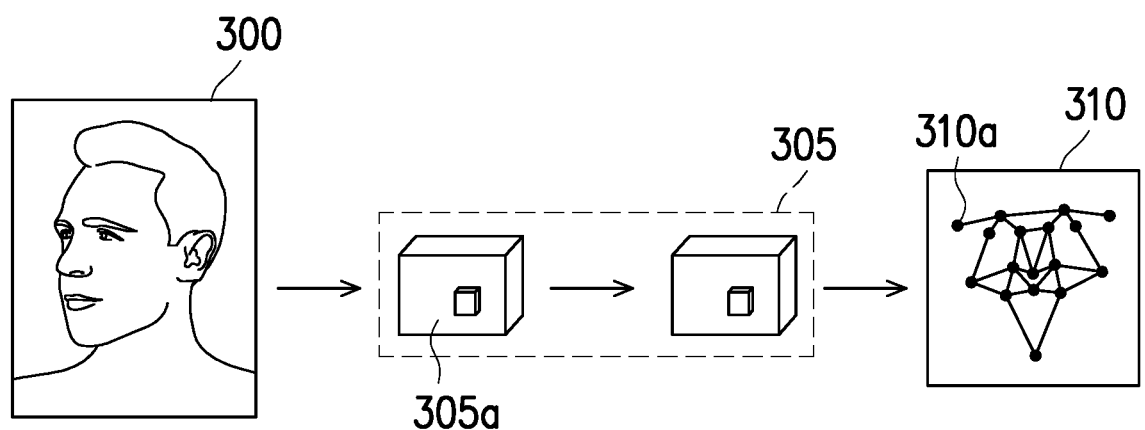
FIG. 3 is a schematic view showing capturing the feature points in the image according to an embodiment of the disclosure.

Referring to FIG. 3, FIG. 3 is a schematic view showing capturing the feature points in the image according to an embodiment of the disclosure. In the present embodiment, an image 300 is, for example, an image including a human face (i.e., a specific object). The image 300 may include a plurality of first pixels, and each first pixel may include a plurality of pieces of color channel information. It is assumed that the length and the width of the image 300 are respectively H and W, and each first pixel has three pieces of color channel information (which may respectively correspond to R, G, and B channels, for example). In this case, each first pixel may be represented in the form of (R, G, B). Correspondingly, the image 300 may be represented as a matrix of W×H×3 (hereinafter referred to as a first matrix M1), for example, but the disclosure is not limited thereto. In addition, the color channel information may include other types. For example, the three pieces of color channel information of each first pixel in the image 300 may respectively correspond to Y, U, and V channels. Correspondingly, the image 300 may be represented as a matrix of X×Y×3, for example.

As shown in FIG. 3, the processor 104 may input the image 300 into a feature point capturing network 305 so that the feature point capturing network 305 recognizes feature points 310a located in the image 300.

For ease of illustration, the feature points 310a considered in the embodiment of the disclosure may be assumed to be facial feature points (which may correspond to facial features such as the nose tip, the chin, etc.) on the human face located in the image 300, but the disclosure is not limited thereto. To achieve this, the processor 104 may correspondingly adopt a feature point capturing network 305 configured to capture the facial feature points, such as CNN networks realized based on techniques including convolutional neural networks (CNN), multi-task cascaded convolutional neural network (MTCNN), dense facial landmarks, and Retina-Face, and the feature point capturing network 305 may include, for example, a convolution layer 305a, but the disclosure is not limited thereto.

In an embodiment, after the feature point capturing network 305 captures the feature points 310a from the image 300, the feature points 310a may be correspondingly presented by a feature point image 310. Specifically, the feature point image 310 may include a plurality of second pixels. In the present embodiment, with the length and the width of the image 300 respectively being H and W, the length and the width of the feature point image 310 will also respectively be H and W. Correspondingly, the feature point image 310 may be represented as a matrix of W$\lambda$H×1 (hereinafter referred to as a second matrix M2), and each matrix element therein may correspond to one of the second pixels. It is understood that, to maintain the simplicity of the drawing, only one feature point 310a is labeled in FIG. 3, and those skilled in the art should be able to understand that the remaining points in the feature point image 310 are also feature points, but the disclosure is not limited thereto.

In an embodiment, a first portion in the second pixels corresponding to the feature points 310a may be defined as a first value (e.g., "1"), and a second portion in the second pixels that does not correspond to the feature points 310a may be defined as a second value (e.g., "0"). In this case, the matrix elements in the second matrix M2 corresponding to the feature points 310a may be represented as 1, and the matrix elements that do not correspond to the feature points 310a may be represented as 0.

In addition, after the feature point capturing network 305 captures the feature points 310a from the image 300, each feature point 310a may be output in a 1×1 vector form. Specifically, it is assumed that the feature point capturing network 305 is configured to capture a fixed number (hereinafter referred to as K) of feature points 310a from the image 300. In this case, the feature point capturing network 305 may capture K feature points 310a (K is a number of the feature points 310a) represented in the 1×1 vector form based on the image 300. In addition, the arrangement sequence of the K feature point vectors (hereinafter referred to as feature point vectors FPV) corresponding to the feature points 310a will also follow a specific rule. More specifically, a feature point vector corresponding to a certain feature will be arranged in a certain fixed order. For example, the order of the feature point vector corresponding to the nose tip will be fixedly arranged at the $i^{th}$ among the K vectors, and the order of the feature point vector corresponding to the chin will be fixedly arranged at the $j^{th}$ among the K vectors, but the disclosure is not limited thereto.

Next, in step S220, the processor 104 may obtain a capsule network. In the embodiment of the disclosure, the adopted capsule network may sequentially include, for example, a convolution layer, one or more capsule layers (the number of which is, for example, P), and an output layer (also referred to as a digit capsule layer).

Based on the understanding of the capsule network by those skilled in the art, it can be known that among the P capsule layers, the $1^{st}$ capsule layer may be generically referred to as a primary capsule layer, and the $2^{nd}$ to $P^{th}$ capsule layers may be generally referred to as routing capsule layers. One or more capsules may be included in each capsule layer. According to the general definition of the capsule network, each capsule is a set of neurons, and the activity vector of the set of neurons may represent an instantiation parameter of a specific type of entity (e.g., an object or a part of an object).

For ease of illustration, in the embodiment of the disclosure, the output of each capsule in the primary capsule layer is simply referred to as an activity vector, and the output of each capsule in each routing capsule layer is referred to as an output vector, but such description is not intended to limit the implementation of the disclosure.

Generally, the convolution layer may be used as the input layer of the capsule network and may be configured to perform a feature capturing operation on the received input (e.g., an image or a data matrix). In this case, the vector output by each neuron in the convolution layer may be referred to as a feature vector (the respective dimensions of which may be N×1, for example), and the feature vectors may be used as the input of the primary capsule layer. After the primary capsule layer receives the N feature vectors, it may generate a plurality of corresponding activity vectors (the number of which corresponds to the number of capsules in the primary capsule layer) based on the feature vectors and provide the activity vectors to the $1^{st}$ routing capsule layer.

Afterwards, the $1^{st}$ routing capsule layer may generate a plurality of output vectors based on the activity vectors. For the $k^{th}$ (k is between 2 and P) routing capsule layer, it may generate a plurality of output vectors of the $k^{th}$ routing capsule layer based on the output vectors generated by the $(k-1)^{th}$ routing capsule layer. Then, the output layer located after the capsule network may convert the output vectors generated by the $P^{th}$ routing capsule layer into a corresponding recognition result.

However, since the above method does not introduce the geometric information in the image to be recognized into the overall recognition mechanism, a better geometric understanding of the image cannot be obtained, which may lead to an undesirable recognition result. Therefore, the disclosure improves the framework and operation mechanism of the capsule network, thereby helping to improve the accuracy of overall recognition.

To facilitate understanding of the concept of the disclosure, further description will be made below with reference to FIG. 4, but it is not intended to limit the possible implementation of the disclosure.

Figure 4:
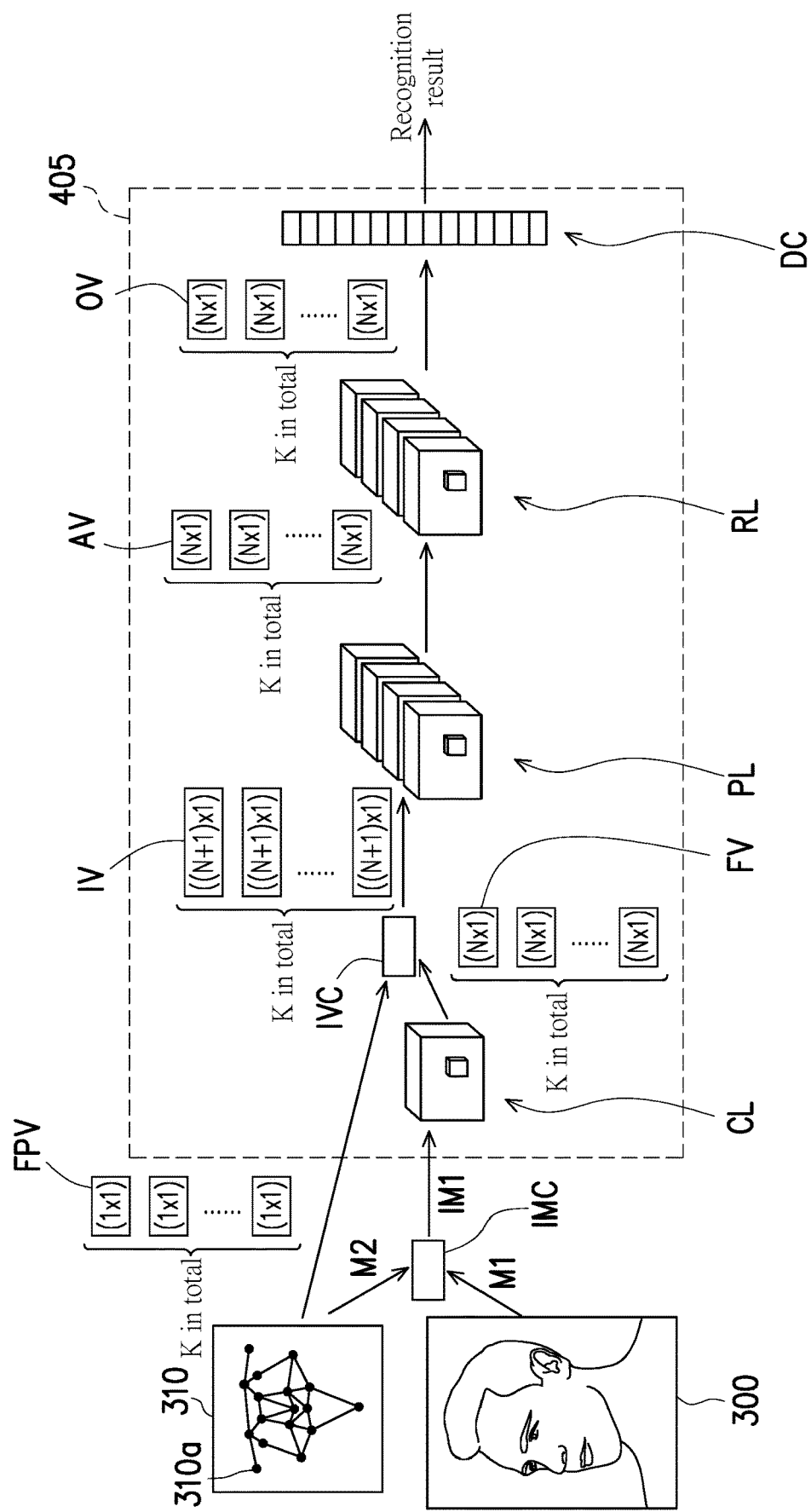
FIG. 4 is a schematic view showing performing recognition based on a capsule network according to FIG. 3.

Referring to FIG. 4, FIG. 4 is a schematic view showing performing recognition based on a capsule network according to FIG. 3. In the present embodiment, a capsule network 405 obtained by the processor 104 may sequentially include, for example, an input matrix concatenation layer IMC, a convolution layer CL, an input vector concatenation layer IVC, a primary capsule layer PL, a routing capsule layer RL, and an output layer DC. That is, the processor 104 may sequentially perform the steps related to an input matrix concatenation layer IMC, a convolution layer CL, an input vector concatenation layer IVC, a primary capsule layer PL, a routing capsule layer RL, and an output layer DC. Although only one routing capsule layer RL is labeled in FIG. 4, those skilled in the art should be able to understand that the routing capsule layer RL may be one or more, but the disclosure is not limited thereto. In addition, it is shown in FIG. 4 that the number of vectors output by each layer is represented by K, but those skilled in the art can understand that the number of vectors output by each layer may be unequal and the number may be arranged to incrementally increase or incrementally decrease according to the design. For example, the primary capsule layer PL may output K activity vectors, the routing capsule layer RL may generate 2K output vectors OV based on the K activity vectors AV, and so on.

Briefly speaking, in the capsule network 405 of the present embodiment, in addition to taking the image 300 to be recognized as an input, the convolution layer CL may further take into account each feature point 310*a* in the feature point image 310. Moreover, for the primary capsule layer PL, different from the known method of only taking the output of the convolution layer CL as an input, the embodiment of the disclosure may further take into account each feature point 310*a* in the feature point image 310. Accordingly, through the method of taking into account both the image 300 and the feature points 310*a*, the disclosure can enable the capsule network 405 to have a better geometric understanding of the image 300, so that the overall recognition mechanism can achieve more accurate recognition performance without a large amount of training data. The details are described as follows.

In step S230, the processor 104 may input the image and the feature points 310*a* into the convolution layer CL to generate a plurality of feature vectors FV. In an embodiment, the processor 104 may input the value of each second pixel and the color channel information of the corresponding first pixel into the input matrix concatenation layer IMC to perform concatenation and output a first input matrix IM1. Specifically, as described in the previous embodiment, since each first pixel in the image 300 may have three pieces of color channel information including R, G, and B, each first pixel may be represented by (R, G, B). In addition, with respect to each first pixel, there is a second pixel located at a corresponding position in the feature point image 310, and the value of each second pixel will be 1 or 0 based on whether it corresponds to the feature point 310*a*.

In this case, the processor 104 may concatenate (R, G, B) of the first pixel and the value of the corresponding second pixel into (R, G, B, X), where if the corresponding second pixel corresponds to one of the feature points 310*a*, then X is 1, and otherwise X is 0. In other words, if the second pixel corresponding to a first pixel in the image 300 is one of the feature points 310*a*, a concatenation result of (R, G, B, 1) may be generated. On the other hand, if the second pixel corresponding to a first pixel is not any feature point, a concatenation result of (R, G, B, 0) may be generated, but the disclosure is not limited thereto. Accordingly, the concatenation results corresponding to each of the first pixels may be represented as the first input matrix IM1 of W×H×4. From another point of view, the first input matrix IM1 may also be regarded as a result of concatenating the first matrix M1 (with dimensions of W×H×3) and the second matrix M2 (with dimensions of W×H×1), but the disclosure is not limited thereto.

Afterwards, the processor 104 may input the first input matrix IM1 into the convolution layer CL so that the convolution layer CL performs a feature capturing operation on the first input matrix IM1 to generate the feature vectors FV. In other words, in the framework of the capsule network 405 of the disclosure, the first input matrix IM1 (i.e., the concatenated first matrix M1 and second matrix M2) is taken as the input of the convolution layer CL, rather than directly taking the first matrix M1 corresponding to the image 300 as the input of the convolution layer CL.

In the present embodiment, the convolution layer CL may generate, for example, K feature vectors FV (the respective dimensions of which are N×1, for example). Reference may be made to the relevant known technical documents for the specific details of the feature capturing operation performed by the convolution layer CL, which shall not be repeatedly described herein.

After the feature vectors FV are generated, in step S240, the processor 104 may input the feature vectors FV and the feature points 310*a* into the primary capsule layer PL to generate a plurality of activity vectors AV. In an embodiment, the processor 104 may input the value of each second pixel and the corresponding feature vector FV into the input vector concatenation layer IVC to perform concatenation and output a plurality of input vectors IV. Specifically, as described in the previous embodiment, the K feature points 310*a* may be represented as K feature point vectors FPV (the respective dimensions of which are 1×1). In this case, the processor 104 may concatenate each feature point vector FPV (with dimensions of 1×1) and the corresponding feature vector FV (with dimensions of N×1) into an input vector IV (with dimensions of (N+1)×1). For example, the processor 104 may concatenate the $z^{th}$ feature point vector FPV and the $z^{th}$ feature vector FV into a $z^{th}$ input vector IV. In other words, the order of the feature points 310*a* (i.e., the order of the feature point vector FPV) corresponds to the order of the feature vector FV.

After generating the K input vectors IV based on the above concatenation operation, the processor 104 may input the input vectors IV into the primary capsule layer PL so that the primary capsule layer PL generates the activity vectors AV (with dimensions of N×1) based on the input vectors IV. In other words, in the framework of the capsule network 405 proposed in the disclosure, the input vectors IV (i.e., the concatenated feature vectors FV and feature point vectors FPV) are taken as the input of the primary capsule layer PL, rather than directly taking the feature vectors FV as the input of the primary capsule layer PL. The operation mechanism of each capsule layer of the disclosure may be performed based on a method familiar to those skilled in the art and shall not be repeatedly described herein.

Next, in step S250, the processor 104 may generate a recognition result corresponding to the image 300 by the routing capsule layer RL and the output layer DC based on the activity vectors AV. In the scenario of FIG. 4, since the capsule network 405 includes only one routing capsule layer RL, the routing capsule layer RL may generate K output vectors OV (the respective dimensions of which are, for example, N×1) based on the K activity vectors AV.

Then, the processor 104 may convert, by the output layer DC, the output vectors OV generated by the routing capsule layer RL into the recognition result corresponding to the image 300 (e.g., a specific identity of the portrait in the image 300).

In other embodiments, if the adopted capsule network includes P routing capsule layers (P is a number of the routing capsule layer), the processor 104 may be configured to: generate a plurality of output vectors by the $1^{st}$ routing capsule layer based on the activity vectors AV; generate, by the $k^{th}$ routing capsule layer, a plurality of output vectors of the $k^{th}$ routing capsule layer based on the output vectors generated by the $(k-1)^{th}$ routing capsule layer, where k is between 2 and P; and convert, by the output layer DC, the output vectors generated by the $P^{th}$ routing capsule layer into the recognition result corresponding to the image 300.

In addition, in an embodiment adopting P routing capsule layers, the number of the activity vectors AV of the primary capsule layer PL may be designed to be not greater than the number of the output vectors of the $1^{st}$ routing capsule layer. Moreover, the number (e.g., 64) of the output vectors of the $j^{th}$ routing capsule layer may be designed to be not greater than the number (e.g., 64, 128, 256, 512, etc.) of the output vectors of the $(j+1)^{th}$ routing capsule layer, where j is between 1 and (P-1). Accordingly, the capsule network can more effectively represent the original image (e.g., the image 300), thereby helping to improve the accuracy of subsequent recognition.

Further, the input matrix concatenation layer IMC and the input vector concatenation layer IVC are configured to perform multiple concatenation operations. Those skilled in the art should be able to understand that similar concatenation operations are also applicable, which shall not be repeatedly described herein.

In brief, the method of the disclosure may be understood as being performed based on two neural networks. In the first neural network, the conventional CNN may be adopted to capture the feature points in the image. For example, a face image may be input into a CNN to perform feature capturing and conversion through multiple convolution layers therein, and then the facial feature points in the image being considered are generated through a fully connected layer and other techniques. In the second neural network (i.e., the capsule network), a multiple-input approach of "facial feature points+face image" may be adopted, in which feature capturing is first performed again by using one to several convolution layers, then the captured features are concatenated with the facial feature points to perform one to several capsule operations, and finally the recognition result is obtained through the output layer or other techniques.

In summary of the above, in the image recognition method and the image recognition device of the disclosure, the feature point capturing network may be first used to find the feature points in the image, and then the improved framework of the capsule network is used to take the feature points as the geometric meaning of the image to assist in the recognition of the image. By feeding the additional information of geometric meaning (i.e., the facial feature points) into the capsule network at the appropriate timing, the understanding of the additional information of geometric meaning by the capsule network can be strengthened. Accordingly, the capsule network can better combine the object features with their geometric meaning, so that the capsule network can obtain better understanding of the object and thereby improve the recognition ability.

Since the capsule network of the disclosure can better understand the object, it means that a better model can be trained by using fewer samples, which thereby achieves better recognition results. In addition, better understanding of the object means that the capsule network of the disclosure can not only perform recognition accurately, but also grasp the relative geometric relationship of object details to improve the understanding of the presentation context of the object content, which thereby enables the current low-end artificial intelligence to further develop toward high-end artificial intelligence. Furthermore, because the capsule network can achieve better understanding of geometric meaning, the trained model can exhibit better resistance in fraud prevention.

In addition, in the training process, the two networks adopted in the disclosure may learn simultaneously or may be trained separately. In some embodiments, the two networks may be trained with a large amount of data or may be simultaneously trained by an end-to-end training method, or the two training methods may be used alternately. In this case, the existing training data can be better utilized.

Although the disclosure has been disclosed with the embodiments above, the embodiments are not intended to limit the disclosure. Any person with ordinary skill in the art may make changes and modifications without departing from the spirit and scope of the disclosure. Therefore, the protection scope of the disclosure shall be determined by the claims attached hereafter. The description above only includes some embodiments of the disclosure and thus does not limit the scope of implementation of the disclosure. Namely, all simple equivalent variations and modifications made according to the claims and description of the disclosure still fall within the scope covered by the disclosure. Moreover, any embodiment or claim of the disclosure is not required to achieve all purposes, advantages, or features disclosed in the disclosure. In addition, the abstract and title merely serve to assist in search of patent documents and are not meant to limit the claims of the disclosure. Furthermore, the terms "first", "second", etc. mentioned in the description or claims are only used to designate names of elements or distinguish among different embodiments or scopes and are not meant to designate upper or lower limits of numbers of elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An image recognition method, comprising:
acquiring an image and capturing a plurality of feature points in the image;
obtaining a capsule network, wherein the capsule network sequentially comprises a convolution layer, a primary capsule layer, at least one routing capsule layer, and an output layer;
inputting the image and the plurality of feature points into the convolution layer to generate a plurality of feature vectors;
inputting the plurality of feature vectors and the plurality of feature points into the primary capsule layer to generate a plurality of activity vectors; and
generating a recognition result corresponding to the image by the at least one routing capsule layer and the output layer based on the plurality of activity vectors.

2. The image recognition method according to claim 1, wherein the step of capturing the plurality of feature points in the image comprises:
inputting the image into a feature point capturing network, and recognizing, by the feature point capturing network, the plurality of feature points located in the image, wherein a sequence of the plurality of feature points corresponds to a sequence of the plurality of feature vectors.

3. The image recognition method according to claim 2, wherein the feature point capturing network is a convolutional neural network.

4. The image recognition method according to claim 1, wherein the image has a plurality of first pixels, each of the first pixels comprises a plurality of pieces of color channel information, the plurality of feature points are located in a feature point image, and the feature point image comprises a plurality of second pixels corresponding to the plurality of first pixels, wherein a first portion in the plurality of second pixels corresponding to the plurality of feature points is defined as a first value, and a second portion in the plurality of second pixels that does not correspond to the plurality of feature points is defined as a second value,
wherein the step of inputting the image and the plurality of feature points into the convolution layer to generate the plurality of feature vectors comprises:
concatenating values of each of the second pixels and the plurality of pieces of color channel information of the corresponding first pixels into a first input matrix; and
inputting the first input matrix into the convolution layer so that the convolution layer performs a feature capturing operation on the first input matrix to generate the plurality of feature vectors.

5. The image recognition method according to claim 1, wherein the image has a plurality of first pixels, each of the first pixels comprises a plurality of pieces of color channel information, the plurality of feature points are located in a feature point image, and the feature point image comprises a plurality of second pixels corresponding to the plurality of first pixels, wherein a first portion in the plurality of second pixels corresponding to the plurality of feature points is defined as a first value, and a second portion in the plurality of second pixels that does not correspond to the plurality of feature points is defined as a second value,
wherein the step of inputting the plurality of feature vectors and the plurality of feature points into the primary capsule layer to generate the plurality of activity vectors comprises:
concatenating values of each of the second pixels and the corresponding feature vectors into a plurality of input vectors; and
inputting the plurality of input vectors into the primary capsule layer so that the primary capsule layer generates the plurality of activity vectors based on the plurality of input vectors.

6. The image recognition method according to claim 1, wherein the at least one routing capsule layer sequentially comprises a $1^{st}$ routing capsule layer to a $P^{th}$ routing capsule layer, where P is a number of the at least one routing capsule layer, and the step of generating the recognition result corresponding to the image by the at least one routing capsule layer and the output layer based on the plurality of activity vectors comprises:
generating a plurality of output vectors by the $1^{st}$ routing capsule layer based on the plurality of activity vectors;
generating, by a $k^{th}$ routing capsule layer, a plurality of output vectors of the $k^{th}$ routing capsule layer based on the plurality of output vectors generated by a $(k-1)^{th}$ routing capsule layer, where k is between 2 and P; and
converting, by the output layer, the plurality of output vectors generated by the $P^{th}$ routing capsule layer into the recognition result corresponding to the image.

7. The image recognition method according to claim 6, wherein a number of the plurality of activity vectors of the primary capsule layer is not greater than a number of the plurality of output vectors of the $1^{st}$ routing capsule layer, and a number of the plurality of output vectors of a $j^{th}$ routing capsule layer is not greater than a number of the plurality of output vectors of a $(j+1)^{th}$ routing capsule layer, where j is between 1 and (P−1).

8. An image recognition device, comprising a storage circuit and a processor, wherein:
the storage circuit is configured to store a plurality of modules, and
the processor is coupled to the storage circuit and is configured to access the plurality of modules to perform the following steps:
acquiring an image and capturing a plurality of feature points in the image;
obtaining a capsule network, wherein the capsule network sequentially comprises a convolution layer, a primary capsule layer, at least one routing capsule layer, and an output layer;
inputting the image and the plurality of feature points into the convolution layer to generate a plurality of feature vectors;
inputting the plurality of feature vectors and the plurality of feature points into the primary capsule layer to generate a plurality of activity vectors; and
generating a recognition result corresponding to the image by the at least one routing capsule layer and the output layer based on the plurality of activity vectors.

9. The image recognition device according to claim 8, wherein the processor is configured to: input the image into a feature point capturing network so that the feature point capturing network recognizes the plurality of feature points located in the image, wherein a sequence of the plurality of feature points corresponds to a sequence of the plurality of feature vectors.

10. The image recognition device according to claim 9, wherein the feature point capturing network is a convolutional neural network.

11. The image recognition device according to claim 8, wherein the image has a plurality of first pixels, each of the first pixels comprises a plurality of pieces of color channel information, the plurality of feature points are located in a feature point image, and the feature point image comprises a plurality of second pixels corresponding to the plurality of first pixels, wherein a first portion in the plurality of second pixels corresponding to the plurality of feature points is defined as a first value, and a second portion in the plurality of second pixels that does not correspond to the plurality of feature points is defined as a second value,
wherein the processor is configured to:
concatenate values of each of the second pixels and the plurality of pieces of color channel information of the corresponding first pixels into a first input matrix; and
input the first input matrix into the convolution layer so that the convolution layer performs a feature capturing operation on the first input matrix to generate the plurality of feature vectors.

12. The image recognition device according to claim 8, wherein the image has a plurality of first pixels, each of the first pixels comprises a plurality of pieces of color channel information, the plurality of feature points are located in a feature point image, and the feature point image comprises a plurality of second pixels corresponding to the plurality of first pixels, wherein a first portion in the plurality of second pixels corresponding to the plurality of feature points is defined as a first value, and a second portion in the plurality of second pixels that does not correspond to the plurality of feature points is defined as a second value,
wherein the processor is configured to:
concatenate values of each of the second pixels and the corresponding feature vectors into a plurality of input vectors; and
input the plurality of input vectors into the primary capsule layer so that the primary capsule layer generates the plurality of activity vectors based on the plurality of input vectors.

13. The image recognition device according to claim 8, wherein the at least one routing capsule layer sequentially comprises a $1^{st}$ routing capsule layer to a $P^{th}$ routing capsule layer, where P is a number of the at least one routing capsule layer, and the processor is configured to:
generate a plurality of output vectors by the $1^{st}$ routing capsule layer based on the plurality of activity vectors;
generate, by a $k^{th}$ routing capsule layer, a plurality of output vectors of the $k^{th}$ routing capsule layer based on the plurality of output vectors generated by a $(k-1)^{th}$ routing capsule layer, where k is between 2 and P; and
convert, by the output layer, the plurality of output vectors generated by the $P^{th}$ routing capsule layer into the recognition result corresponding to the image.

14. The image recognition device according to claim 13, wherein a number of the plurality of activity vectors of the primary capsule layer is not greater than a number of the plurality of output vectors of the $1^{st}$ routing capsule layer, and a number of the plurality of output vectors of a $j^{th}$ routing capsule layer is not greater than a number of the plurality of output vectors of a $(j+1)^{th}$ routing capsule layer, where j is between 1 and (P−1).

* * * * *